(Model.)
J. JANOWITZ.
CORSET STAY.
No. 496,313. Patented Apr. 25, 1893.
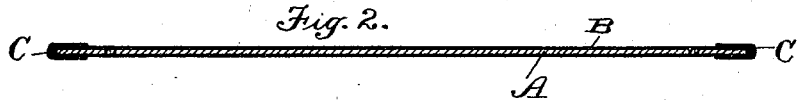
Witnesses
Thos. E. Robertson
W. E. Clendaniel
Inventor
Julius Janowitz,
By T. J. W. Robertson,
Attorney
THE NORRIS PETERS CO., PHOTO-LITHO., WASHINGTON, D. C.

UNITED STATES PATENT OFFICE.

JULIUS JANOWITZ, OF NEW YORK, N. Y.

CORSET-STAY.

SPECIFICATION forming part of Letters Patent No. 496,313, dated April 25, 1893.

Application filed November 15, 1892. Serial No. 452,028. (Model.)

*To all whom it may concern:*

Be it known that I, JULIUS JANOWITZ, a citizen of the United States of America, residing at New York city, in the county and State of New York, have invented certain new and useful Improvements in Corset-Stays, of which the following is a specification, reference being had therein to the accompanying drawings.

This improvement relates to that class of corset stays or steels which are provided with rubber cushions, and the invention consists in the peculiar construction of the same as hereinafter more particularly described and then definitely claimed.

In the accompanying drawings—Figure 1 is a plan of a stay constructed according to my improvement, and Fig. 2 is a central longitudinal section of the same.

Heretofore corset stays or steels have been covered with various materials and provided with cushions on their ends, also of various materials; but these coatings and cushions have heretofore been made separately and without any intimate union between the materials forming the coating and cushions, and therefore the cushions have had to be fastened on in various ways, such as sewing, riveting, &c., but in my steel the coating and rubber cushions are firmly united in the process of vulcanization.

In carrying out my invention, I coat the body of the steel A with a thin sheet of hard rubber composition B, and form cushions C on the end with soft rubber compound, taking care that the coating and cushions join or (preferably) lap one on the other. After vulcanization it will be found that the coating and cushions are firmly united together, forming practically one piece, so that there is no likelihood of the cushions separating from the steels, and besides this the hard rubber coating will reinforce the steels to a considerable extent by its own resiliency, and thus add to its stiffness.

The rubber on the steels may be vulcanized in various ways. The steels may be covered with the hard composition first, and then vulcanized, after which the ends may be dipped in or coated with very soft rubber paste which may be then vulcanized by heat or by the acid process, as desired. The fact that the coating on the bodies of the steels has already been vulcanized is of no consequence, as the hard rubber will not be injured by the after vulcanization of the soft rubber. Or the vulcanization may be done at one operation, either by selecting the proper gums (some of which harden at a lesser heat than others) or by subjecting the coating on the body of the steels to a greater heat than the ends. In some cases I may protect the ends of the steels from the heat used to harden the coating on the bodies, or after heating all the steels to a point sufficient to vulcanize the soft rubber, I may set them in a vulcanizer constructed to receive the bodies of steels, and allow the ends to project outside and then re-heat them until the body coating has become hard.

The hard and soft compounds for coating and making the cushions and the acid process of vulcanization are well known to those skilled in the art and it is therefore unnecessary to give the formula for preparing them.

I do not limit myself to the described mode of applying the coating and cushions, nor to any particular compound of rubber, nor even to rubber alone, (although I prefer it) as other materials may be employed in lieu thereof at the will of the manufacturer.

I am aware that it is not new to form articles of hard and soft rubber in one piece, that it is not new to cover corset steels with hard rubber, and that it has been proposed to cut rubber tubes into short lengths and cement such short rubber tubes on the end of corset steels, and make no claim therefore to either of these devices.

What I claim is—

1. A stay having a resilient core, a hard body coating for the same and an end cushion of soft material, said hard coating and soft cushion being of one piece, substantially as described.

2. As an improved article of manufacture, a stay consisting of a steel core having a coating of hard rubber and cushions of soft rubber on its ends united by vulcanization, substantially as described and shown.

In testimony whereof I affix my signature, in presence of two witnesses, this 14th day of November, 1892.

JULIUS JANOWITZ.

Witnesses:
A. R. STRUTT,
LEO COHES.